Nov. 24, 1959 J. R. HERMANN 2,913,981
PORTABLE IMPRINTING AUTOGRAPHIC REGISTER
Filed Dec. 9, 1954 3 Sheets-Sheet 3
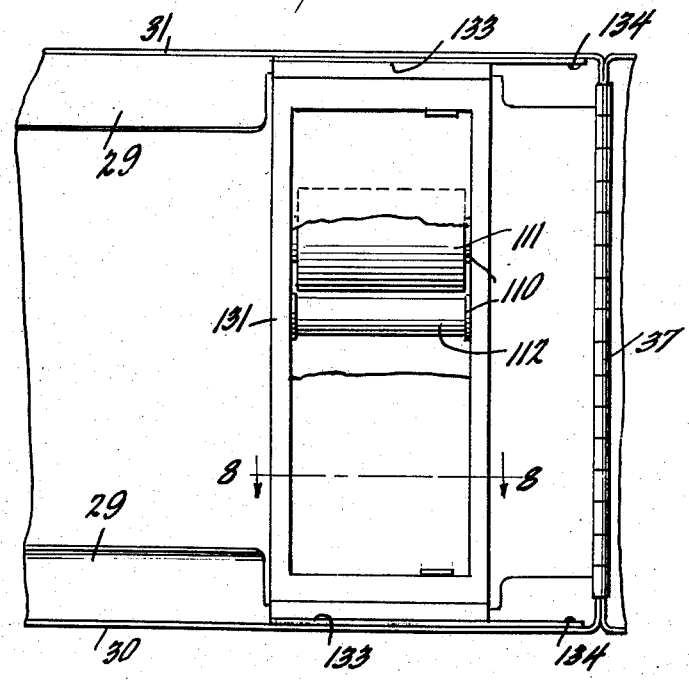
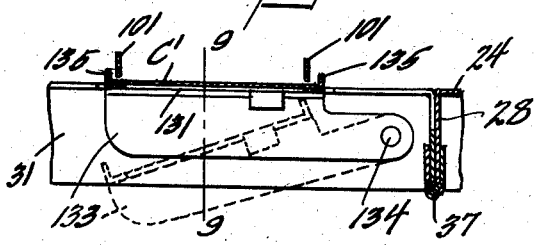
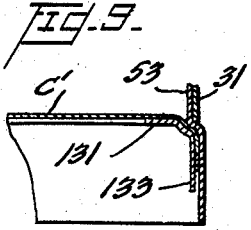
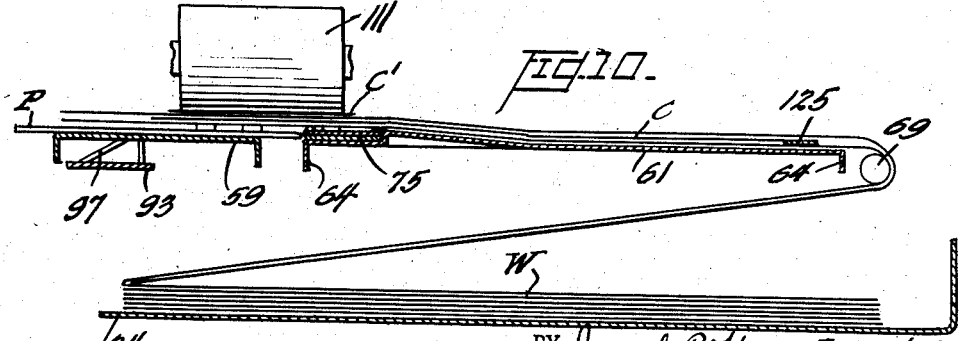
BY Joseph R Hermann Inventor
Watson, Cole, Grindle & Watson ATTORNEYS

United States Patent Office 2,913,981
Patented Nov. 24, 1959

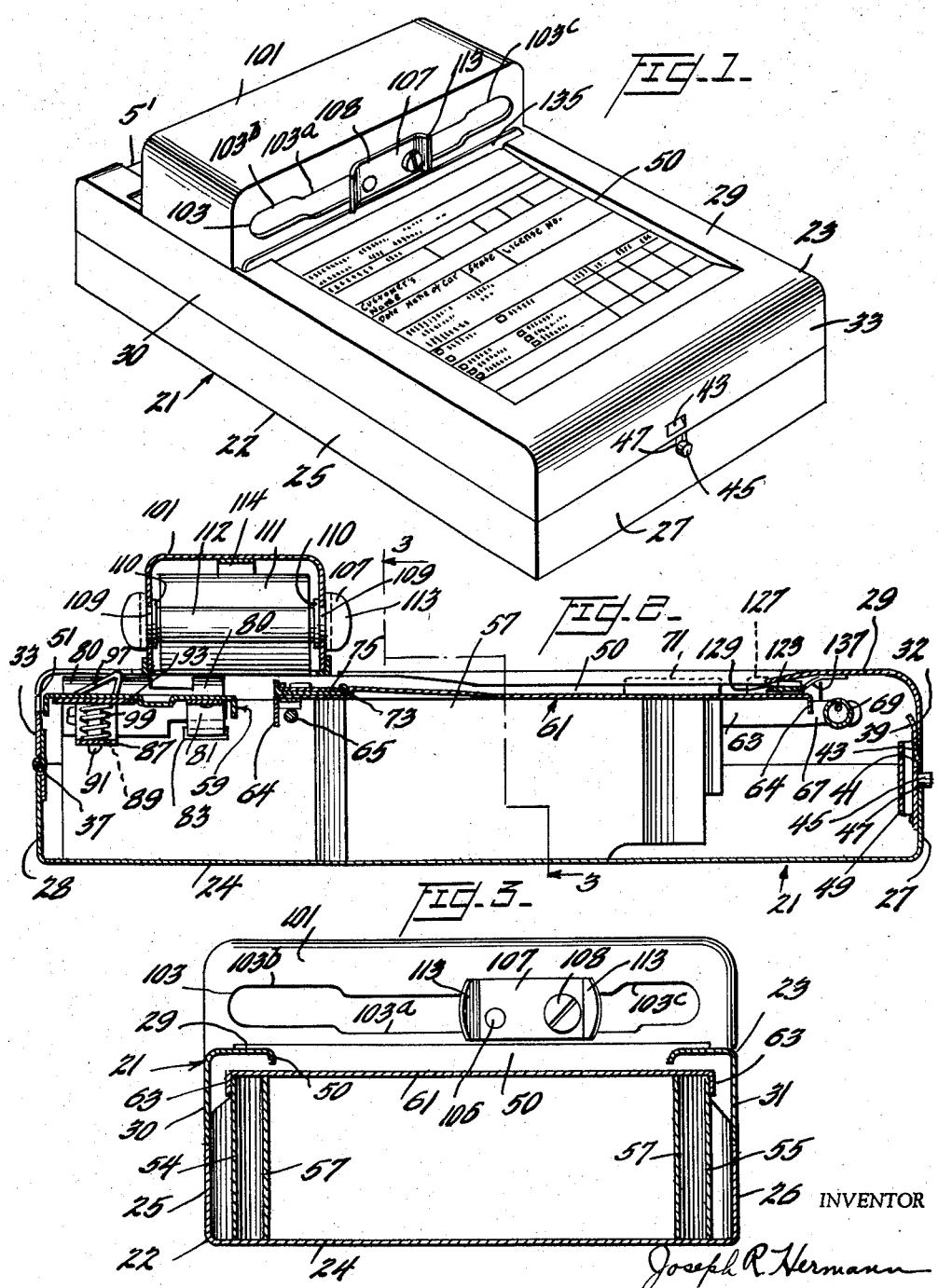

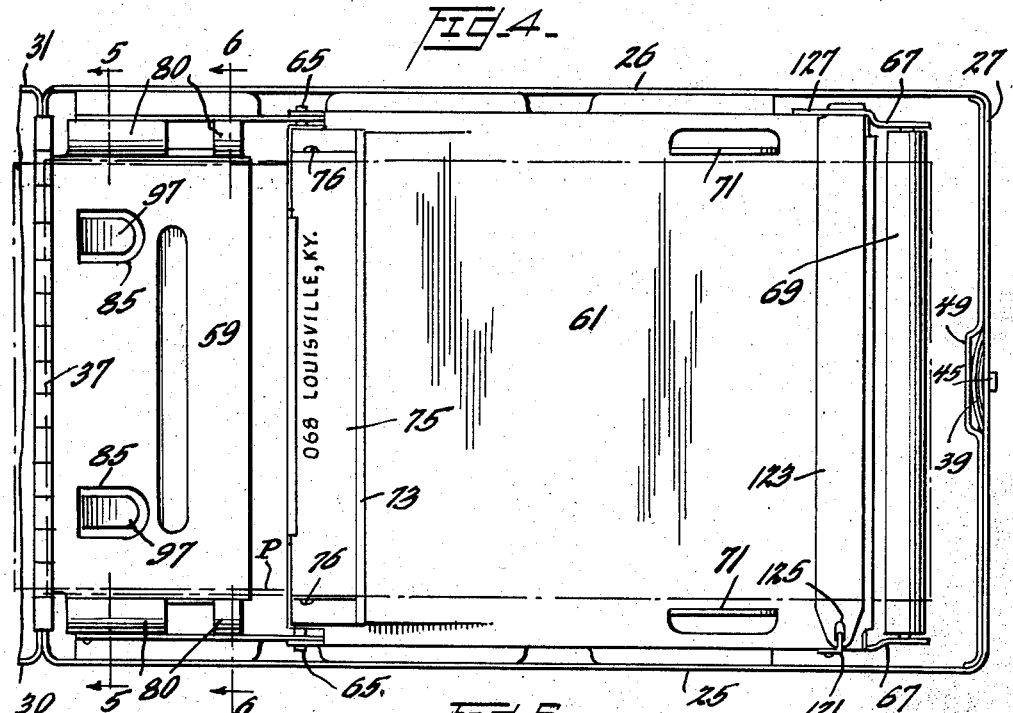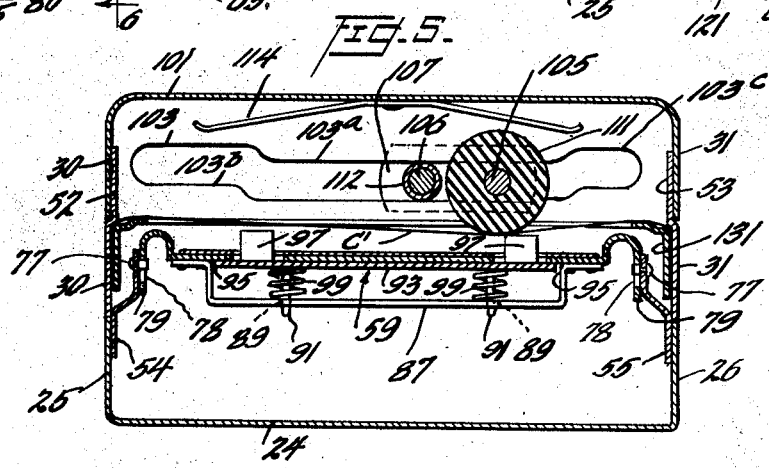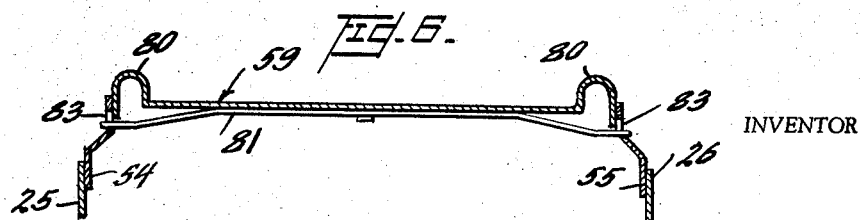

2,913,981

PORTABLE IMPRINTING AUTOGRAPHIC REGISTER

Joseph R. Hermann, Kenmore, N.Y., assignor to Moore Business Forms, Inc., Niagara Falls, N.Y., a corporation of Delaware Application December 9, 1954, Serial No. 474,171

6 Claims. (Cl. 101—269)

This invention relates to autographic registers and is directed more particularly to a portable register of unusually compact design which is adapted for the imprinting of certain indicia, principally for credit identification purposes.

In an effort to simplify retail credit transactions and thus shorten the time required for recording the same, both on the part of the customer and the salesperson, large stores, gasoline companies, airlines, hotels, etc., have adopted the expedient of furnishing to each person maintaining an account a small identification plate, usually formed of deformable sheet metal, which bears in raised characters the customer's name, account number, and, frequently, his address as well. Such plates eliminate the necessity of the salesperson's writing this information on the sales slip and greatly expedite the entire transaction, it being merely necessary for the salesperson to insert the plate in a suitable printing device which transfers a printing impression to the sales slip.

Numerous printing devices adapted for this purpose are currently available but, for the most part, they possess several disadvantages which it is the principal object of this invention to overcome. In the first place, they have been of a type which must be fixed in place at a particular location so that they cannot be readily moved for purposes of convenience or to meet an uncommonly large volume of sales at a given counter. Secondly, they have been disassociated from a supply of sales slips so that it has been necessary for the salesperson to have access to a separate supply of such slips, usually in the form of a salesbook, which is subject to being misplaced and hampers the printing operation. Thirdly, they have been provided with inking means for only the original of the slip so that the original and each duplicate, except the last, must carry on its rear face impression transfer means or, alternatively, separate transfer means, such as sheets of carbon paper, must be available which are interleaved and aligned with each set of sales slips. Finally, they have been relatively delicate in construction and expensive to manufacture.

Therefore, among the objects of the present invention is the provision of a compact portable imprinting autographic register having its own supply of sales records which is adapted for use with individual credit identification printing plates.

A further object of this invention is to provide a lightweight, portable imprinting autographic register which is simple in design, durable in construction and virtually impossible to misuse or be inadvertently rendered inoperable.

Another object of the invention is to provide an imprinting autographic register having a simplified impression transfer means which can be readily replaced when its usefulness has become exhausted.

A still further object of the invention is to provide an autographic register having an imprinting mechanism formed in integral association therewith in which such mechanism has a minimum number of moving parts and is capable of withstanding a maximum amount of abuse without failure and which, during a printing operation, does not make a double impression.

Other objects and advantages will be suggested by the following detailed description when read in conjunction with the accompanying drawings in which:

Fig. 1 is a perspective view of the register of the present invention;

Fig. 2 is a longitudinal sectional view;

Fig. 3 is a transverse sectional view taken substantially along line 3—3 of Fig. 2;

Fig. 4 is a plan view of the register with the cover or top half of the casing open to reveal the writing and printing platen;

Fig. 5 is a transverse sectional view taken along line 5—5 of Fig. 4 but with the cover in closed position;

Fig. 6 is a transverse sectional view substantially along line 6—6 of Fig. 4, only a fragment of the casing being shown;

Fig. 7 is a view looking downwardly at the interior of the top of the casing;

Fig. 8 is a partial sectional view taken along line 8—8 of Fig. 7;

Fig. 9 is a fragmentary sectional view taken along line 9—9 of Fig. 8; and

Fig. 10 is a partial longitudinal section, in somewhat diagrammatic form, showing the web of sales slips in operative position.

In accordance with one embodiment, the invention includes a hinged casing adapted for the reception of a zig-zag folded continuous multiple web of sales records or slips, suitably perforated at spaced points, the upper face of the casing being substantially open to permit each set of slips to be inscribed and/or imprinted. Mounted within the casing in substantially co-planar, spaced longitudinal relationship are two platens, one principally for writing purposes and the other for printing purposes, the latter being adapted to support an individual printing plate. The printing platen also floatingly supports a slip registering device which engages suitable apertures provided adjacent the leading edge of each set of slips. The open upper face of the casing in the region of the printing platen is bridged by a printing mechanism housing in which a printing roller is mounted for transverse movement, the roller being guided into printing contact with the printing platen for an intermediate major portion of such transverse movement and removed from printing contact adjacent the ends thereof. Suitable duplicate impression transfer means is floatingly carried by the writing platen while an original impression transfer means is disposed beneath the printing roller housing.

Turning now to a description of an illustrative embodiment of the invention, the numeral 21 in the drawings generally designates a two-part casing, preferably stamped from or otherwise formed of lightweight strong sheet metal. The lower half 22 of casing 21 includes a bottom 24 and two parallel side walls 25 and 26, and two parallel end walls 27 and 28, while the upper half 23 is correspondingly formed with a top wall 29, and two parallel side walls 30 and 31, and two parallel end walls 32 and 33. The casing is adapted for the reception of a supply of sales records, slips, or tickets, preferably in the form of a zig-zag folded, lengthy web as indicated at W in Fig. 10, the web being divided into individual slips by suitable perforation lines and having the usual registration apertures adjacent the leading edge of each slip. The particular form of the invention which has been illustrated is intended for use with a "duplex" set of sales slips, that is, a set having an original and a duplicate, but it will be apparent that the number of slips in a set could be varied to meet the needs of a given situation with only very minor changes in the register, as will hereinafter be pointed out.

To facilitate access to the interior of casing 21, as for the purpose of replenishing the supply of sales slips, the two halves 22 and 23 are hinged together at the adjacent edges of two corresponding end walls, as at 37, and a suitable latch is provided at the other end walls thereof, the latch taking, for example, the form of a leaf spring 39, riveted at one end to end wall 27 and projecting at the other end above the upper termination of end wall 27, being cut away as at 41 for engagement with a projection 43 pressed out of end wall 32. A release button 45 projects through an opening 47 in end wall 27 and to protect spring 39 from accidental permanent deformation a protective plate 49 is advantageously secured to the inner surface of wall 27, the central portion of the plate being slightly offset inwardly to permit the spring to yield for purposes of disengagement and, at the same time, limit the yielding movement to an extent that cannot exceed its elastic limit. The major portion of top wall 29 is cut away, leaving inwardly extending marginal flanges around three sides thereof, defining an opening 50 which, as can be seen in Fig. 2, extends into end wall 33, as at 51. Sections 52 and 53 (Fig. 5) of the two opposite marginal flanges contiguous with side walls 30 and 31 are bent upwardly for a purpose that will hereinafter appear.

Secured, by spot-welding, for example, to side walls 25 and 26 are a pair of vertically arranged parallel supporting plates 54 and 55, having a vertical dimension somewhat greater than that of side walls 25 and 26, each of which carries a channel-like member 57 for maintaining the supply of sales slips in proper alignment within the casing. The plates 54 and 55 also support in normally horizontal position a small platen and a large platen, generally designated 59 and 61, respectively. The platen 61 consists of a rectangular generally planar member, having dependent flanges 63 and 64, respectively, along the sides and ends thereof normally overlapping the upper edges of plates 54 and 55, which is pivotally connected at one end along an axis spaced from end wall 28 to plates 54 and 55 by means of a pin 65 extending through registering apertures in flanges 63 and plates 54 and 55. The longitudinal extent of the platen 61 is preferably such that it terminates somewhat short of front end wall 27, the flanges 63 having forwardly projecting extensions 67 rotatably support a roller 69 to facilitate the passage of the sales slips from the supply area around the front edge of platen 61. A pair of spaced vertical tabs 71 are bent vertically from the forward side portions of platen 61 in order to properly position the slips with respect to the platen. It should be obvious that the platen 61 is intended principally for writing purposes, that is, that it functions as a supporting surface for that part of the sales slips on which is written the information peculiar to each sale, such as the items sold, their price, and the total amount involved in the transaction. It has been found advantageous, however, to secure across the extreme rearward marginal portion of platen 61 a flat channel-like member 73 which is adapted to receive a rather narrow fixed or permanent printing plate 75 shown in Fig. 4. On this plate is inscribed in raised characters data that is common to, or would remain unchanged during, a series of sales transactions, such as the name and address of the particular retail outlet at which the sale takes place, the "master" account number of that particular outlet, and possibly the identification number of the sales person involved as well. To releasably retain this plate in its designated position, a lug or projection 76 may be raised from the channel 73 adjacent each end thereof which engages the edges of the printing plate.

The small platen 59 is, in most instances, constructed of heavier sheet metal than is the large platen 61 and is pivotally mounted at its rear end to the extreme rear corners of the supporting plates 54 and 55 by means of inwardly projecting stub pins 77 affixed to the plates and penetrating oversize apertures 78 in depending side flanges 79 (Fig. 5). This platen is also of rectangular generally planar configuration but is substantially shorter than the platen 61 so that it terminates slightly short of the extreme rear edge of platen 61. The marginal portions of platen 59 contiguous to side flanges 79 are deformed in generally inverted U shape, as at 80, to provide guides for the rearward stretch of the path of the slip through the register. For the purpose of maintaining the platen in operative horizontal position, there is secured to the undersurface thereof a slightly bowed heavy leaf spring 81 (Fig. 6), which projects past the side edges of the platen and engages apertures 83 punched out of the supporting plates 54 and 55.

The principal function of platen 59 is to support, during an imprinting operation, the individual credit identification plate P supplied to the customer in the position shown in dotted lines in Fig. 4 and solid lines in Fig. 10, and hence it is preferably termed the printing platen. A secondary function, however, is to locate or register each of the sets of sales slips in proper position for imprinting and/or inscribing and, to this this end, a pair of transversely elongated apertures 85 are punched out of platen 59 near its rear edge, and beneath these apertures extends a U-shaped bracket 87 which is attached at its ends to the undersurface of the platen. Formed in the horizontal portion of bracket 87 is a spaced pair of small apertures 89 which are penetrated by a corresponding pair of tongues 91. The tongues 91 extend vertically downwardly from a cross-piece 93 having notched ends 95 for engagement with the vertical portions of the bracket, the crosspiece thus being capable of limited vertical movement but incapable of side-to-side or front-to-back movement. Mounted on the upper surface of crosspiece 93 is a spaced pair of forwardly inclined fingers 97 which project through the platen apertures 85 which are adapted to engage the apertures provided in the sales slips for that purpose. The crosspiece, and the slip-registering fingers associated therewith, are biased upwardly by means of coil springs 99 encircling tongues 91 between the undersurface of the cross-piece and the horizontal portion of bracket 87, and thus the registering action is automatic, the fingers probing the undersurface of the set of slips as they are advanced through the machine until the slip apertures come into position, at which time the fingers move upwardly into engaging position and prevent further advance of the set of slips until manually disengaged. It will be observed that the registering fingers are floatingly mounted, and, accordingly, do not offer any appreciable resistance to the placement of the individual printing plates on the printing platen 59, as they are merely depressed to an out-of-the-way position below the surface of the platen as can be seen in Fig. 10.

The mechanism which actually effects a printing impression is inclosed within a housing 101 extending transversely across opening 50 in top wall 29 and secured at its lower side portion to the upwardly bent marginal flange portions 52, 53. The dimension of the housing in the direction of the longitudinal axis of the casing is such that the housing overlies approximately the forward half of the printing platen 59 as well as the fixed printing plate 75 on writing platen 61. Formed in the front and rear walls of housing 101 is a parallel pair of guide slots or cam tracks 103 which have a depressed central portion 103a somewhat less than the transverse extent of opening 50. Extending between and projecting slightly beyond both slots are two rods or shafts 105 and 106 which are maintained in spaced parallel relationship by a pair of plates 107 disposed externally of housing 101 and connected to the projecting ends of the rods. Preferably, one end of each rod is permanently riveted or braded to the one of the plates while the other end is removably affixed to the other plate, as by means of a screw 108 in threadwise engagement with a tapped axial bore (not shown) in such end, in order to permit disassembly. Rotatably carried by each end of each rod is a narrow roller 109 which rides in slots 103, being retained therein by an internal integral flange 110 on the one side and the plates 107 on the other side. One of the rods 105 rotatably supports a printing roller 111 formed of hard rubber or other suitable material, having a diameter such that it projects slightly below the plane of top wall 29, and the other rod 106 supports a spacing sleeve 112. Sleeve 112 holds the rollers 109 associated with rod 106 in contact with the slots and together with rod 105 and plates 107 maintains the printing roller at right angles with the slots, thereby avoiding the possibility of the roller canting and jamming in the slots.

The movement of the printing mechanism within housing 101 is accomplished by hand, the plates 107 being gripped between the thumb and forefinger and it is desirable that the ends of the plates be bent outwardly, as at 113, from the housing to provide a more secure grip. It is necessary that the printing roller be removed from contact with the sales slip at each end of a printing stroke so that the slip may be advanced and, as has already been mentioned, the central portion 103a of the slots 103 is depressed, leaving the ends 103b and 103c somewhat relieved. As the roller enters the relieved ends, it is elevated slightly away from the slip. As a result of the presence of rod 106, the extent of the relieved portion at one end must be greater than at the other, as can be seen in Fig. 3. The printing roller is held in out-of-contact position by a leaf spring detent 114.

It will be apparent that the register of the present invention is not of the direct printing type, which is to say, that the printing plate is neither coated with ink, which is then transferred to the sales slip, nor is an inking ribbon interposed between the printing plate and the sales slip, but rather the impression is created indirectly by means of an impression transfer medium adapted to be pressed against that face of the slip which is opposite to the printing plate. It has already been explained that certain information is printed on the one portion of the sales slip while other information is inscribed by hand on a second portion of the sales slip and in the latter case since the information is written directly on the original of a set of slips only an impression transfer medium for a duplicate or copy is required. In accordance with the illustrated embodiment of the invention, it is contemplated that a single impression transfer medium be employed for transferring to the duplicate of the set of slips an impression from both the printed and inscribed information. To this end, a small loop 121 of fairly rigid wire is attached to the writing platen 61 near one of its forward corners, to which is connected one end of a thin blade of resilient spring metal 123 slightly greater in length than the width or transverse dimension of platen 61, the end of blade 123 being suitably apertured at 125 for penetration by loop 121. On the other forward corner of platen 61 is provided an upstanding tab 127 (Fig. 2), having a horizontal slot 129 into which the free hand of blade 123 fits and by which it is retained. To the blade is fastened one end of a sheet of carbon paper C by means of spaced openings punched in one end of the sheets for this purpose. The carbon sheet should usually be of a width corresponding to the set of sales slips and of a length such that it will cover the entire longitudinal dimension of the writing plate 61 and extend over a sufficient portion of the printing platen 59 as to overlie the printing characters carried by the individual printing plate. Thus, the carbon sheet may terminate at its free end just short of the registering fingers 97. As the blade is supported only by its ends beyond the side edges of the sales slips, the carbon assumes the position between the original and duplicate of the slips and freely permits the passage of each of them through the register. When a carbon sheet has reached the limit of its usefulness, a fresh sheet may be inserted by merely bending the blade 123 until its free end is disengaged from slot 129, removing the worn sheet from the blade and inserting the blade into the punched opening of the new sheet, after which the blade may be again bent and reinserted in slot 129, being then ready for use. It will be understood that if more than two copies (an original and one duplicate) of the sales slip are desired, the only change that would be required would be the provision of a second blade similar to blade 125 to hold a second sheet of carbon paper.

For the purpose of transferring to the original of the set of slips an impression from the individual printing plate, a relatively narrow sheet of carbon paper C' is disposed directly beneath the housing 101 (Figs. 5 and 8-10). This sheet is held in place by means of a rectangular frame 131 having downwardly directed flanges 133 at the extreme side edges thereof, which are pivotally connected at 134 to the side walls 30 and 31 of upper half 23 of casing 21, and very narrow flanges 135 at the front and rear thereof which extend upwardly and overlap with the lower front and rear edges of housing 101. The sheet of carbon paper is preferably somewhat longer than the transverse width of the entire casing so that the unused portions at the extreme sides thereof are frictionally retained between the side flanges 133 and the corresponding portions of side walls 30 and 31 to maintain the sheet in place. A worn sheet may be replaced by pivoting frame 131 away from housing 101 and side walls 30 and 31 to release the old sheet; a new sheet is then laid in place on the frame with its sides extending around flanges 133 and the frame moved back to operative position, the movement automatically causing the sheet to become taut.

The sales slips used in connection with this device will inherently possess a certain amount of resiliency or resistance to bending and during their passage through the register may exhibit a certain undesirable tendency to buckle, particularly since the perforation line will normally not coincide with the bend in the region of roller 69. This tendency may be avoided by providing a small amount of resistance to the movement of the set of slips which may be accomplished by attaching to the undersurface of the front marginal portion of top 29 a downwardly and rearwardly directed hold-down spring 137 (Fig. 2).

The operation of the invention proceeds in the following manner: Assuming that the ink transfer medium or carbon paper has already been put in place in the fashion just described, the latch holding the two halves of casing 21 closed is disengaged, the upper half of the casing 23 is pivoted upwardly with respect to the lower half, writing platen 61 is also pivoted upwardly around pin 65 and a stack of the sets of sales slips is inserted in the lower half of the casing, beneath the writing platen, and between the aligning members 57. The writing platen is next returned to its normal horizontal position at which it is held by supporting plates 54 and 55. The first set of the supply of sales slips is pulled out from beneath the writing platen 61, around roller 69, and the duplicate of this set is inserted between platen 61 and blade 123 and moved toward the rear of the register beneath carbon C until the apertures are engaged by the fingers 97, while the original of the set is placed in position over the duplicate impression transfer means (carbon C) with its apertures penetrated by fingers 97. The register is then ready for use. When a transaction is to be recorded, the necessary data peculiar to the sale is transcribed by hand, after which the printing plate supplied by the customer is inserted at the rear of the register between printing platen 59 and housing 101 and beneath both of the sales slips to the position shown in Fig. 10, with the printing characters facing upwardly. The printing roller is then moved once completely from one side of the housing to the other which causes an impression to be made on both slips. The plate is then removed and the rear edges of both slips grasped, moved forwardly and upwardly to disengage fingers 97 and then rearwardly until the next set is brought into place. The first set may then be torn along the perforation line and disposed of in the usual manner.

Having thus described the invention, what is claimed as new and desired to be secured by Letters Patent is:

1. An imprinting autographic register for printing sales slips with an individual printing plate having raised characters comprising a casing adapted to contain a supply in web form of said slips, the top wall of said casing having an opening therein through which said slips may be inscribed by hand; a writing platen pivotally mounted in said casing and normally supported in substantially parallel relationship with said top wall, said writing platen having an area substantially coextensive with the forward major portion of said opening; a printing platen mounted in said casing, having its forward edge substantially contiguous with the rearward edge of said writing platen and its area substantially coextensive with the remainder of said opening, said slips being adapted to be successively moved from said supply over said platens from front to back, a portion of said printing platen being adapted to support in printing position said printing plate with said characters facing upwardly beneath the corresponding portion of the slip to be printed, said casing being cut away at the rear wall thereof to permit said printing plate to be freely insertable in and removable from said printing position; a housing including spaced apart front and rear walls mounted exteriorly of said casing, bridging the opening in the casing top wall above said printing platen and overlying said individual plate when the latter is in printing position, said housing front and rear walls having corresponding cam slots therein extending at least substantially across the full width of the opening in said casing top wall, the end portions of said cam slots being upwardly relieved; a printing roller having end portions of reduced diameter mounted for movement in said housing with said end portions fitting in said cam slots and guided out of printing contact with said slip by the relieved slot end portions and into printing contact by the remaining portion of said slots, said roller end portions extending externally of said housing for manual engagement and movement in said housing as guided by said slots; and a rod disposed in said housing and rigidly connected adjacent the ends thereof to the roller end portions in spaced parallel non-coaxial relationship with said roller, the ends of said rod fitting in said slots, said rod having adjacent its ends enlargements contacting the housing front and end walls directly adjacent said slots whereby said rod serves to maintain said roller generally at right angles to said slotted housing walls despite application of unequal force to the roller end portions to move the roller.

2. An imprinting autographic register for printing sales slips with an individual printing plate having raised characters comprising a casing adapted to contain a supply in web form of said slips, the top wall of said casing having an opening therein through which said slips may be inscribed by hand, a writing platen pivotally mounted in said casing and normally supported in substantially parallel relationship with said top wall, said writing platen having an area substantially coextensive with the forward major portion of said opening, a printing platen mounted in said casing, having its forward edge substantially contiguous with the rearward edge of said writing platen and its area substantially coextensive with the remainder of said opening, said slips being adapted to be successively moved from said supply over said platens from front to back, a portion of said printing platen being adapted to support in printing position said printing plate with said characters facing upwardly beneath the corresponding portion of the slip to be printed, said casing being cut away at the rear wall thereof to permit said printing plate to be freely insertable in and removable from said printing position, a housing mounted exteriorly of said casing, bridging said opening in the region of said printing platen at the top thereof, and overlying said plate when in printing position, a printing roller supported by said housing for movement transversely of said opening to bring a portion of said slip into printing contact with said plate to effect a printing impression, means connected to said roller externally of said housing whereby said roller may be moved by hand, said means being wholly within the confines of said casing, and means for releasably retaining impression transfer means beneath the path of said printing roller and above the slip to be printed, wherein said retaining means comprises a frame pivotally mounted in said casing beneath said housing, said frame having downwardly extending flanges at the sides thereof in frictional engagement with the corresponding portions of the casing sides, portions of said transfer means extending between said flanges and said portions to thereby retain said transfer means in position.

3. The register of claim 1 wherein said roller end portions are rigidly connected to the rod ends by plates located externally of said housing closely adjacent said slotted walls and said plates are adapted for manual engagement to move said rollers.

4. An imprinting autographic register for printing sales slips, each with registering apertures adjacent the leading edge thereof, with an individual printing plate having raised characters, comprising a casing adapted to contain a supply in web form of said slips, said casing having in the top wall thereof an opening through which said slips may be inscribed by hand and in at least the rear wall thereof, an opening through which said slips may be manually engaged by the leading edge and removed from the casing one by one; a writing platen pivotally mounted in said casing and normally supported in substantially parallel relationship in said top wall, said writing platen having an area substantially coextensive with the forward major portion of said opening; a printing platen mounted in said casing having its forward edge substantially contiguous with the rearward edge of said writing platen, its rearward edge adjacent the opening in the casing rear wall and its area substantially coextensive with the remainder of said opening, said slips being adapted to be successively moved from said supply over said platens from front to back, said individual plate being freely insertable to and removable from printing position through said opening in said casing rear wall and when in printing position being supported on said printing platen with the plate characters facing upwardly beneath the corresponding portion of said slip; slip registering means yieldably carried by said printing platen adjacent said opening in the casing rear wall and being normally biased to a position to engage said slip apertures, said registering means including an inclined surface acted upon by said individual plate when the latter is inserted in printing position to depress said registering means to a position out of engagement with said slip apertures, said individual plate and slip being removable simultaneously and together upon completion of the printing operation; a housing mounted exteriorly of said casing, bridging said opening in the region of said printing platen at the top thereof, and overlying said plate when in printing position, a printing roller supported by said housing for movement transversely of said opening to bring a portion of said slip into printing contact with said plate to effect a printing impression, and means connected to said roller externally of said housing whereby said roller may be moved by hand, said means being wholly within the confines of said casing.

5. In an autographic register for printing sales slips, having slip-aligning apertures adjacent the leading edges thereof, with a removable individual printing plate, a casing for receiving a supply of said slips, said casing having an opening in an end wall thereof through which said slips may be removed one by one by engagement with the leading edge, means in said casing adjacent said opening for supporting in printing position between said support and a slip to be printed said individual plate, said plate being placed in said printing position and removed therefrom through said opening, slip registering fingers floatingly carried by said support adjacent said opening and normally urged toward said slip to engage said slip apertures, said fingers being depressed away from said slip by said plate when placed in printing position whereby said plate and slip may be together engaged by hand through said opening and simultaneously removed from said casing upon completion of a printing operation.

6. A register as in claim 5 wherein said fingers are inclined away from said casing opening whereby insertion of the plate through the opening into printing position cams said fingers away from said slips.

References Cited in the file of this patent

UNITED STATES PATENTS

| | | |
|---|---|---|
| 2,102,787 | Christenson | Dec. 21, 1937 |
| 2,290,097 | Dunn | July 14, 1942 |
| 2,606,494 | Vogt | Aug. 12, 1952 |
| 2,633,075 | Gruver | Mar. 31, 1953 |
| 2,782,714 | Davidson | Feb. 26, 1957 |